(12) United States Patent
Frausing

(10) Patent No.: US 11,427,491 B2
(45) Date of Patent: Aug. 30, 2022

(54) POND FILTER AND METHOD FOR OPERATING THE POND FILTER

(71) Applicant: EASYFIRM APS, Frederikssund (DK)

(72) Inventor: Niels Frausing, Frederikssund (DK)

(73) Assignee: EASYFIRM APS, Frederikssund (DK)

( * ) Notice: Subject to any disclaimer, the term of this patent is extended or adjusted under 35 U.S.C. 154(b) by 58 days.

(21) Appl. No.: 16/607,969

(22) PCT Filed: May 1, 2018

(86) PCT No.: PCT/EP2018/061074
§ 371 (c)(1),
(2) Date: Oct. 24, 2019

(87) PCT Pub. No.: WO2018/206342
PCT Pub. Date: Nov. 15, 2018

(65) Prior Publication Data
US 2021/0101816 A1  Apr. 8, 2021

(30) Foreign Application Priority Data

May 2, 2017  (EP) .................................. 17169016

(51) Int. Cl.
*C02F 9/00* (2006.01)
*B01D 24/28* (2006.01)
(Continued)

(52) U.S. Cl.
CPC .............. *C02F 9/005* (2013.01); *A01G 31/00* (2013.01); *A01K 61/80* (2017.01); *A01K 63/045* (2013.01);
(Continued)

(58) Field of Classification Search
CPC .. A01G 2031/006; A01G 31/00; A01K 61/80; A01K 63/04; A01K 63/045;
(Continued)

(56) References Cited

U.S. PATENT DOCUMENTS

| | | | |
|---|---|---|---|
| 4,676,914 A * | 6/1987 | Mills ........................ | F04B 49/06 210/138 |
| 5,730,861 A | 3/1998 | Sterghos et al. | |

(Continued)

FOREIGN PATENT DOCUMENTS

| | | |
|---|---|---|
| CN | 104039413 A | 9/2014 |
| CN | 105848762 A | 8/2016 |

(Continued)

OTHER PUBLICATIONS

International Search Report dated Oct. 19, 2018 for PCT/EP2018/061074.

(Continued)

*Primary Examiner* — Terry K Cecil
(74) *Attorney, Agent, or Firm* — Schmeiser, Olsen & Watts, LLP

(57) ABSTRACT

Pond filter unit and a method for operating a pond filter unit (1). A control unit (12) controls the operation of the pond filter unit (1), including the cleaning cycle of the filter (2', 2", 2'''). The pond filter unit (1) further comprises one or more plugs (14) for connecting one or more auxiliary devices, such as a separate pump, one or more additional pond filter units, illumination devices/lamps, air pumps, and/or feed automats. The control unit (12) of the pond filter further controls the one or more auxiliary devices connected to the plugs (14), such as pumps, air pumps, automatic feeding devices based on input settings for each of the one or more auxiliary devices. The control unit (12) further controls the cleaning cycle for cleaning of the filter (2) in the vessel (3). The cleaning cycle comprises a sequence of backwash and/or a mechanical filter cleaning sequence where a filter cleaning motor unit (6) rotates the filter cleaning device (7) in the vessel. During backwash, the valve (8) directs the water to the waste water outlet (11). The filter unit allows to control the one or more auxiliary devices (Continued)

by the pond filter control unit (12), and to coordinate the control of the additional devices in relation to the control of the filter.

10 Claims, 4 Drawing Sheets

(51) Int. Cl.
| | |
|---|---|
| *B01D 24/46* | (2006.01) |
| *B01D 29/31* | (2006.01) |
| *B01D 29/60* | (2006.01) |
| *C02F 1/00* | (2006.01) |
| *C02F 1/32* | (2006.01) |
| *A01K 61/80* | (2017.01) |
| *A01G 31/00* | (2018.01) |
| *A01K 63/04* | (2006.01) |
| *B01D 29/64* | (2006.01) |
| *B01D 29/66* | (2006.01) |
| *B01D 39/16* | (2006.01) |
| *C02F 3/10* | (2006.01) |
| *C02F 101/10* | (2006.01) |
| *C02F 101/16* | (2006.01) |
| *C02F 103/00* | (2006.01) |

(52) U.S. Cl.
CPC ............ *A01K 63/047* (2013.01); *B01D 24/28* (2013.01); *B01D 24/46* (2013.01); *B01D 29/31* (2013.01); *B01D 29/60* (2013.01); *B01D 29/6476* (2013.01); *B01D 29/668* (2013.01); *B01D 39/1676* (2013.01); *C02F 1/008* (2013.01); *A01G 2031/006* (2013.01); *B01D 2201/16* (2013.01); *B01D 2201/54* (2013.01); *B01D 2201/56* (2013.01); *C02F 1/001* (2013.01); *C02F 1/325* (2013.01); *C02F 3/103* (2013.01); *C02F 3/109* (2013.01); *C02F 2101/105* (2013.01); *C02F 2101/163* (2013.01); *C02F 2103/007* (2013.01); *C02F 2201/005* (2013.01); *C02F 2201/326* (2013.01); *C02F 2209/008* (2013.01); *C02F 2303/16* (2013.01)

(58) Field of Classification Search
CPC .............. A01K 63/047; B01D 2201/16; B01D 2201/54; B01D 2201/56; B01D 24/28; B01D 24/46; B01D 29/31; B01D 29/33; B01D 29/60; B01D 29/606; B01D 29/6476; B01D 29/66; B01D 29/668; B01D 39/1676; C02F 1/001; C02F 1/008; C02F 1/32; C02F 1/325; C02F 2101/105; C02F 2101/163; C02F 2103/007; C02F 2201/005; C02F 2201/326; C02F 2209/008; C02F 2209/02; C02F 2209/03; C02F 2209/22; C02F 2209/42; C02F 2303/16; C02F 3/103; C02F 3/109; C02F 9/005

See application file for complete search history.

(56) References Cited

U.S. PATENT DOCUMENTS

| | | | |
|---|---|---|---|
| 9,861,083 B2 * | 1/2018 | Paxton | ................ B01D 24/165 |
| 2009/0218285 A1 | 9/2009 | Hank | |
| 2010/0237254 A1 | 9/2010 | Mason et al. | |
| 2013/0284647 A1 * | 10/2013 | Briscoe | ................ C02F 1/008 |
| | | | 210/96.1 |
| 2018/0192621 A1 * | 7/2018 | Valatka | ................ A01K 63/045 |

FOREIGN PATENT DOCUMENTS

| | | | | |
|---|---|---|---|---|
| CN | 105981679 A | | 10/2016 | |
| GB | 2316335 A | * | 2/1998 | ............ B01D 35/26 |
| JP | H10156112 A | | 6/1998 | |
| JP | 3045478 B2 | | 5/2000 | |
| JP | 2006026594 A | | 2/2006 | |
| WO | 2006046037 A1 | | 5/2006 | |
| WO | WO-2013093396 A2 | * | 6/2013 | ........... A01K 63/045 |

OTHER PUBLICATIONS

Written Opinion dated Oct. 19, 2018 for PCT/EP2018/061074.
International Preliminary Report on Patentability dated Jul. 22, 2019 for PCT/EP2018/061074.
European Search Report dated Oct. 26, 2017 for EP Application No. 17169016.7.

* cited by examiner

POND FILTER AND METHOD FOR OPERATING THE POND FILTER

CROSS-REFERENCE TO RELATED APPLICATIONS

This application claims priority to PCT Application No. PCT/EP2018/061074, having a filing date of May 1, 2018, which is based on EP Application No. 17169016.7, having a filing date of May 2, 2017, the entire contents both of which are hereby incorporated by reference.

FIELD OF TECHNOLOGY

The following relates to a pond filter unit for pumping, circulating and purifying water in ponds, fountains or similar aquatic applications, the pond filter unit comprising a filter unit contained in a vessel, a pump and at least one valve for controlling the water flow to and from the filter unit, and where the pond filter further comprises a cleaning arrangement for cleaning the filter material in the pond filter.

In addition, the following relates to a method for operating a pond filter unit according to embodiments of the present invention.

BACKGROUND

Presently, pond filter units are used for applications in relation to fish ponds, fountains or other aquacultures, which are especially used in gardens, parks or similar applications, e.g. in aquaria. Similarly pond filter units may be used in connection with commercial fish ponds for breeding edible fish.

In the present application the term "pond" will also encompass other bodies of water, which are maintained in an artificial environment or artificial surroundings, such as garden ponds, fountains etc. as those mentioned in the foregoing paragraph.

Pond filter units typically comprise a filter unit contained in a vessel optionally a pump and at least one valve for controlling the water flow to and from the filter unit.

The pond water is circulated through the filter unit and back to the pond after being filtered through the filter for removing suspended solids or particulate matter contained in the body of water. In addition, a natural biological aerobic filter gradually builds up on and/or in the filter material because microorganisms present in the water adheres to the filter material grows and accumulates during natural growth of the microorganisms. This biofilter layer of microorganisms assists in removal of certain compounds or nutrients from the water, such as organic matter, such as fish feed surplus matter, inorganic contaminants, e.g. N-compounds, P-compounds etc. The compounds are removed from the water by accumulation, digestion and/or conversion thereof during growth of the microorganisms in the biofilter layer. Thus, the biofilter assists in purifying the body of water for soluble matter, e.g. inorganic salts etc. as is well known in connection with pond filters.

Usually filter blocks or loose filter bodies provide surfaces for the growth of the biofilm in biofilters. Such filters are easily cleaned for surplus biofilm at frequent intervals.

Membrane filters and sand filters are highly unsuitable in cleaning water from fish ponds because the water is medium to heavily loaded with particulates (and nutrients, organic carbon) and will clog very quickly.

The known pond filter units usually further comprise a manually operated cleaning arrangement for cleaning the filter material in the pond filter. Regular cleaning of the filter material in the pond filter is necessary in order to remove any accumulated suspended solids or other particulate matter as well as for removing any surplus built-up layer of the microorganisms present in the biological layer on the filter material order to avoid clogging of the filter unit and thus reduce the risk of the filter becoming inefficient.

The nature of such cleaning arrangements varies and may relate to backflushing of the filter, mechanically wringing, beating or rubbing of the filter body or filter material to remove any particulate matter caught in the filter material during filtration and/or to remove any surplus biomaterial, such as microorganisms, slime, soil etc. from the biofilter layer on and/or in the filter material.

US 2009/218285 discloses a membrane unit for cleaning swimming pool water comprising a membrane filter contained in a vessel and means for cleaning the membrane by back flushing the membrane.

U.S. Pat. No. 5,730,861A discloses a filter system for cleaning pool water comprising a network of interacting pool maintenance components operating under the direction of a controller. The system comprising a sand filter, a backwash arrangement, and an integrated control unit.

CN 105981679A discloses a fish tank or an aquarium with a biofilter for cleaning water that is recycled to the fish tank. The biofilter unit comprises a biofilter contained in a vessel. The system further comprises at least one valve for controlling a water flow to and from the biofilter. The pond biofilter unit further comprises a control unit for controlling the operation of the pond biofilter unit including a cleaning cycle of the biofilter.

JP 3045478 discloses a system for water treatment of a fish pond, comprising anaerobic and aerobic treatment for removing ammonia from the water.

In order to maintain a delicate balance of the content of nutrients present in the water in the pond, especially when aquatic animals, such as fish, live in the water it is necessary to ensure that the filter unit runs properly at all times and that the filter material is frequently rinsed in order to avoid clogging of the filter. If the filter does not perform in an optimal manner, e.g. because of clogging of the filter material due to this may lead to reduced performance of the pond filter unit leading to insufficient purification of the water in the pond and thus cause increased growth of algae, death or diseases in the fish stock present in the pond etc.

SUMMARY

An aspect relates to an improved pond filter unit, and a method for operating the pond filter unit, which is effective in purifying water, so the water can be recirculated to the pond.

Thus it is also an aspect of embodiments of the present invention to provide an improved pond filter unit, and a method for operating the pond filter unit which is effective in purifying and recycling (fish) pond water, having a medium to high load of particulates, nutrients and/or organic carbon, and/or where there is low or no risk that the filter clogs.

It is also an aspect of embodiments of the present invention to provide an improved pond filter unit, and a method for operating the pond filter unit which control unit is easily operated by a user and/or in which settings are checked and/or changed by the user.

Thus, it is an aspect of embodiments of the present invention to provide an improved pond filter unit, and a method for operating the pond filter unit which the maintenance of the filter unit is effectively controlled in an automated manner.

It is also an aspect of embodiments of the present invention to provide an improved pond filter unit, and a method for operating the pond filter unit which ensures that the filter can be cleaned regularly without manual interaction.

It is also an aspect of embodiments of the present invention to provide an improved pond filter unit, and a method for operating the pond filter unit which reduces the risk of increased algae growth and/or decreases the risk of death or diseases in the fish stock present in the pond caused by a clogged or malfunctioning filter or caused by an insufficiently rinsed filter unit.

It is also an aspect of embodiments of the present invention to provide an improved pond filter unit and a method for operating the pond filter unit which is able to control other equipment used in connection with ponds.

In addition, it is an aspect of embodiments of the present invention to provide an improved pond filter unit and a method for operating the pond filter unit which is able to control other filter units and/or other equipment used in connection with ponds, such as pumps, illumination/lamps, air pumps, feeders etc.

Thus embodiments of the present invention provides a pond filter unit for pumping, circulating and purifying water in ponds, fountains or similar aquatic applications, the pond filter unit comprising a biofilter contained in a vessel on which filter material, a biofilm of microorganisms, is intended to grow, and at least one valve for controlling the water flow to and from the biofilter, and where the pond filter unit further comprises a cleaning arrangement for cleaning the filter material and/or for removal of surplus biofilm in the biofilter, wherein the pond filter unit comprises an integrated control unit controlling the operation of the pond filter, including the cleaning cycle of the filter, and wherein the pond filter unit further comprises one or more plugs to which one or more auxiliary devices are connectable, such as one or more pumps, one or more additional pond filter units, air pumps, illumination unit(s), and/or feeder unit(s) for automated feeding of aquatic animals, such as fish, or combinations thereof, and where the integrated pond filter control unit further is configured to operate the one or more auxiliary devices based on input settings for each of the one or more auxiliary devices, and wherein the control unit controls each of the one or more additional devices by controlling the power output in the plug to which the additional device is connected to the pond filter, such as by turning on/off the power supply or varying the output current or frequency to the relevant plug, by providing control signal, such as a control signal through a wired or a wireless connection to the one or more additional device, or by providing a control signal to the one or more additional devices, or by means of a wired connection, such as by means of a low voltage control signal.

This provides the possibility of controlling other equipment that is connected to the pond filter unit by the control unit in the pond filter unit. Thus, it is possible to provide a control regime in which the auxiliary devices and the pond filter unit are controlled from the same controller, i.e. the pond filter controller. This provides the possibility of creating a control regime of all devices that are adapted to the relevant pond. In addition, the person that owns or provides maintenance to the pond may have an individual need for automation or manual control, which can be met by embodiments of the present invention.

For example, the pond filter unit and/or the auxiliary devices may be easily regulated and changed in a single controller in relation to the need for purification of the water as well as the need for the operation of the auxiliary devices, e.g. an air pump, or a fish feeding machine. The single control unit may e.g. be controlled to adjust to the individual pond, e.g. the size of the pond/the amount of water to be filtered, the season of the year, e.g. summer/winter modes, variations of the amount of water in the pond e.g. caused by rainy or dry periods, the number, size and/or species of the aquatic animals living in the pond, demand for air in pond, fish feeding etc.

Thus, each auxiliary device may be controlled together with the pond filter unit or separately from the pond filter unit depending on the requirements of the owner or based on the conditions in the pond. This provides simple and easily accessible control of the pond filter unit and the auxiliary devices. It may for example be possible to ensure that an automatic fish feeding device in a pond is only feeding during day time, i.e. the time where the fish and/or other aquatic animals present in the pond are active or that the automatic feeding device is not dosing feed to the pond while a cleaning cycle is running. Another example ensures that an air pump is providing extra oxygen to the pond during cleaning cycles.

As the filtration system is the main key function in a controlled aquatic environment, embodiments of the invention provides all vital controls for maintaining a healthy aquatic environment in a compact economic and easily managed system capable of adding and controlling other key functions like pumps and feeders and extra applications in relation to the aquatic environment and surroundings.

Existing external systems are mainly constructed for general use like lighting/irrigation purpose or power control and potentially garden equipment as a separate application without a main focus and controls covered by embodiments of the invention.

The embodiments provide unique control and surveillance for ponds and aquatic environments in a simple, compact, economic and easily managed system with the focus on the correct functioning of the filter unit, which is important for maintaining a clean and stable aquatic environment.

In the simplest variant of the pond filter unit, the plugs are female plugs for providing electrical current to power the one or more auxiliary devices. This provides the possibility of controlling the one or more auxiliary devices in a simple on/off manner by the control unit providing controls signals that turns the electrical current on or off to the relevant plug in order to control the auxiliary device that is connected to the relevant plug. This may provide a simple but efficient way to control one or more auxiliary devices, e.g. an air pump, an automatic feeding device and/or illumination means.

The output current through the plugs is as provided through the power grid in the region, e.g. 230V alternating current as in Europe.

Alternatively, one or more plugs may provide a low voltage current, e.g. 12 V direct current depending on the requirements of the auxiliary devices, whereby a separate device does not need a separate transformer for providing electric current to operate this particular device. This may be relevant where one or more of the auxiliary devices are provided without a built-in transformer. A transformer may also be included in the pond filter control unit to provide a signal current, e.g. a 0-10 V control signal.

The control unit comprises a processor and a memory that stores information related to each 20 of the auxiliary devices that are attached to the plugs of the pond filter unit, the settings for the pond filter unit and/or any relevant auxiliary device that may be connected to the pond filter.

Alternatively, the auxiliary device may be controlled by dimming, i.e. increasing and/or decreasing, respectively, the electrical current or frequency supplied through the relevant plug. Thus, in addition to on/off control of e.g. an air pump, it is possible to control the pumping effect of the air pump. Similarly, the speed of an automatic feeding device and/or light intensity of illumination means may be varied by controlling the output current in the plug by "dimming".

Alternatively or in combination thereof, one or more second type of plugs in the pond filter may be designed to provide a low voltage current, e.g. 0-10 V direct current control signal, which is used as a control signal for controlling the auxiliary device attached to the relevant second type plug by means of a wired connection.

The one or more plugs in the control unit of the pond filter unit may be a female or male plug, into which an adapter is provided to allow for adaption to the various standards used for electrical female/male plugs that are allowed to be applied to electrically driven apparatuses in different countries, in particular for connecting the devices to the power grid in that region. Or the one or more plugs in filter unit may comprise standard female plugs which fits to the male plugs used to connect to the power grid in that country or region.

In a variant, the female/male plugs in the pond filter unit are specially designed plugs that only fit together with auxiliary devices having an opposed male/female plug. This eliminates the risk of potentially dangerous situations, e.g. caused by overload of the electrical supply through the pond filter unit that may occur if a user connects equipment that is not designed to be connected to the pond filter unit. This risk is eliminated when using specially designed plugs, because it is not be possible to connect other equipment that is used around the fish pond, e.g. an electrical lawn mower, to the plugs.

The input to the settings may be set on the pond filter control unit by means of input devices, e.g. a number of buttons, a touch screen or similar input options. A display panel may be applied to the control unit that shows the current settings for the pond filter unit and/or the one or more auxiliary devices.

Alternatively, the settings may be applied by a remote-control device as discussed further below.

Based on the settings stored in the control unit memory, the control unit in the pond filter controls the operation of the pond filter. In addition the pond filter control unit controls and/or each of the one or more additional devices by controlling the power output in the plug to which the additional device is connected to the pond filter, such as by turning on/off the power supply or varying the output current or frequency to the relevant plug, by providing control signal, such as a control signal through a wired or a wireless connection to the one or more additional device, or by providing a control signal to the one or more additional devices, or by means of a wired connection, such as by means of a low voltage control signal. This is discussed further below.

The pond filter unit has a filter cleaning unit. The filter material in the pond filter unit comprises at least one or more blocks of flexible filter material, such as polymeric open pored foam or a flexible block of fibrous filter material. The one or more filter blocks are e.g. arranged as plates comprising a central hole which is arranged on a tube or the UV lamp unit as described below. In this way the one or more filter blocks are arranged to be rotatable in the vessel.

The motorized cleaning unit comprises a rotatable longitudinal rod arranged in connection with the periphery of the filter material. The rotatable rod presses against the outer surface of the one or more blocks of filter material. The rotatable rod has a profiled surface that causes a mechanical action against the outer surface of the filter blocks when the rod is rotated by the motor unit resulting in that the filter material rotates while the rod presses against the surface of the filter blocks and causes a combined wringing, beating and rubbing action on the filter material. This loosens a part of the biofilm and/or particles present in the filter. The loosened biofilter material and the particles may then be withdrawn from the filter during a simultaneous or later backwash cycle.

The profiled rod may e.g. comprise radially extending wings; the surface of a relatively rod may comprise grooves, e.g. longitudinally extending grooves or the like.

The profiled rod may e.g. be connected to the motor unit by means of a threaded connection, which enables exchange of the profiled rod, e.g. when the rod is worn or defect and has to be replaced. This enables that the owner can replace the worn profile rod with a new one himself or herself.

The at least one or more blocks of flexible filter material, such as polymeric open pored foam or a flexible block of fibrous filter material on which a biofilm of microorganisms adhere and grow as already described above. The one or more filter blocks are cleaned at intervals as described below so as to remove any surplus biofilm.

In a variant of the biofilter, the biofilter unit may alternatively, or in combination with the above-mentioned filter blocks, comprise a drum-like netting or a container, which is filled with conventional loose biofilter bodies, such as balls, raschig rings or similarly conventional loose bio filter filling bodies. This increases the biofilter capacity and allows for alternative removal of surplus biofilm during filter cleaning by rotating the drum and thereby stir the filter bodies. This loosens some of the biofilm and allows it to be removed from the filter material.

In another alternative, a cylindrical filter block may surround or be integrated into the drum containing the loose filter bodies. The cleaning of the foamed cylindrical block using the rotating rod as described above also provides the required stirring that cleans of surplus biofilm from the loose filter bodies.

Alternatively, a cylindrical filter block may be surrounded by the drum containing the loose filter bodies.

In another alternative, the biofilter unit comprises a drum or container with one or more compartments or drums with loose filter bodies. The biofilter is cleaned for any surplus of biofilm and/or particulate material by stirring the loose filter bodies at intervals. The filter bodies are stirred means of the drum or container is arranged to be rotatable in the vessel, e.g. a motorized drive unit, or the above described motorized cleaning unit comprises a rotatable longitudinal rod arranged in the drum or container to stir the loose filter bodies inside the drum or container.

In yet another alternative, the biofilter container comprises two or more chambers, e.g. connected in series, where the chambers contain loose filter bodies or blocks as described above.

The cleaning cycle of the pond filter is controlled by the pond filter control unit as described further below.

The motorized cleaning unit is controlled by the pond filter control unit by means of control signals from the control unit. Thus, the pond filter control unit comprises settings for the frequency as well as the duration of the cleaning cycle in which the motorized cleaning unit is activated.

In addition to the pond filter motorized cleaner the pond filter is equipped to provide backflushing of the filter. The backflushing means comprises a 3-way valve that directs a reversed flow of pond water to a sewer when exiting the pond filter during the cleaning cycle. The backflushing may be activated alone and/or together with the rotatable rod of the motorized filter cleaning unit, e.g. as discussed further below. The 3-way valve is valve is actuated to change the valve seat position based on control signals from the pond filter control unit. The 3-way valve is e.g. a motorized magnetically actuated valve or driven by a motor with switches in the relevant positions. The 3-way valve is also actuated by means of control signals from the pond filter control unit.

The pond filter unit may further comprise a UV lamp unit arranged to expose a water flow through the filter unit, the outlet flow of the filter unit to ultraviolet radiation, and that the control unit is configured to control the operation of the UV lamp according to input settings on the of duration of the ultraviolet radiation and/or intervals between activation of ultraviolet radiation.

The UV lamp settings are set to activate the lamp for one or more defined intervals as well as duration. The UV lamp is activated for a certain period at certain intervals. The duration as well as the intervals depend on the degree of soiling, in particular by algae present in the pond water. The amount of algae present in the pond water depends on the temperature the amount of sunlight and/or artificial light, which sunlight is often is stronger at high temperatures, and/or the amount of waste products and/or the content of organic and/or inorganic nitrogen and/or Phosphorous compounds, in particular inorganic compounds such as ammonium _N nitrate-N Phosphate-P etc. in the water). Thus, during warm periods, e.g. summertime, the UV lamp may be on for a longer period than during winter. A preset duration of the UVA lamp may be set to 0.05-24 hours per day. The settings may be adjusted according to requirements in the individual pond, the season etc. either on the panel on the control unit or by means of the remote-control device. For example, during summer the UV-lamp may be turned on continuously.

The UV lamp unit may be arranged in an outlet tube of the filter unit. The outlet tube may be provided in the vessel so that the above-mentioned filter blocks are arranged on the outer surface of the outlet tube as described above.

The pond filter control unit is remote controllable by means of a remote-control unit. The remote-control unit may provide control signals by means of a wired or a wireless connection to the pond filter control unit. A wireless connection or wireless communication is e.g. connections based on infrared, radio frequency, NFC (Near Field communication), Bluetooth, LoRa (long range), or equal protocols, mobile phone network, local wired or WIFI network and/or a combination thereof. The remote-control unit may thus be a conventional separately produced remote control unit based on short range wireless connection, in particular infrared connections. Alternatively, the remote-control unit may comprise a control application or program installed on a stationary or portable computer, a tablet and/or a cell phone, in particular a smart phone.

When the remote-control unit is a control application installed on a mobile phone, in particular a smart phone, it becomes possible to control the pond filter and/or the one or more auxiliary devices that are connected to the one or more plugs from a remote distance. For example, the owner of a garden pond may monitor and/or activate the operation and/or cleaning cycle of the pond filter. Similarly, the one or more auxiliary devices that are connected to the plug(s) on the pond filter unit, e.g. the automatic feeding device may be activated from a remote distance.

Similarly, when the remote control unit is a control application installed on a mobile phone, in particular a smart phone, it becomes possible to control several pond filter units, e.g. in a master-slave configuration or individually, depending on whether the pond filters are applied to same pond or to different ponds, e.g. when the garden owner is on vacation away from the garden with the pond in which the pond filter is installed. This also enables a caretaker or service provider, which attends to the service of several ponds (e.g. ponds at several different positions, such as gardens at different owners) to monitor and/or control several pond filters as well as the auxiliary devices installed in connection to a particular pond.

The pond filter unit is modular, whereby each part can easily be replaced to ensure safety, low down time during maintenance and reduced costs for repair and/or maintenance.

The embodiments also provide a method for operating a pond filter unit according to embodiments of the present invention. A control unit controls the operation of the pond filter unit, including the cleaning cycle of the filter. The pond filter unit further comprises one or more plugs for connecting one or more auxiliary devices, such as one or more additional pond filter units, air pumps, and/or a feeder units for automated feeding of fish living in the pond, and the control unit of the pond filter further controls the one or more auxiliary devices based on input settings for each of the one or more auxiliary devices. The control unit controls each of the one or more additional devices by controlling the power output in the plug to which the additional device is connected to the pond filter, such as by turning on/off the power supply or varying the output current or frequency to the relevant plug, by providing control signal, such as a control signal through a wired or a wireless connection to the one or more additional device, or by providing a control signal to the one or more additional devices, or by means of a wired connection, such as by means of a low voltage control signal.

Hereby is obtained that the pond filter control unit is also able to control the auxiliary devices that are connected to the one or more plugs. Thus, it becomes possible to control an auxiliary device, e.g. a pump, an air pump, an automatic feeding device while using the same control unit. This enables the possibility of aligning the operation of such auxiliary devices with the control of the filter unit. For example, if an external pump is used together with the pond filter unit, for circulating the pond water through the pond filter, then the control of the pump, such as the pumping effect during normal filtration mode and/or the reversal of flow during a backflushing sequence, can be controlled from the pond filter unit and thus be coordinated with the control of the pond filter control, including the filter cleaning procedure.

The pond filter control unit is designed to activate/deactivate the cleaning cycle of the pond filter unit, the UV lamp and/or one or more auxiliary devices, either by automated activation/deactivation by the control application on the remote control unit and/or when a manual input is made on the remote control unit or the control display on the pond filter.

The control unit may further contain one or more alarm function in case of malfunction, such as malfunction or failure of pond filter unit, e.g. clogging of the filter, UV lamp, 3-way valve and/or the integrated or separate water circulation pump.

Further to notifying the owner, caretaker and/or the service provider that attends service of the pond filter the alarm-function may be set to perform one or more a special actions—like switching on an air pump in case of malfunction of the filter or pump to prevent increased mortality or diseases in the stock of aquatic animals in the pond; stopping pumping water to the drain or introduction of fresh water to the pond to prevent unintentional loss of water, etc.

In addition, the input means on the remote control unit or the control display on the pond filter can be used for changing the settings for the UV lamp, the pond filter unit, e.g. cleaning cycle duration and/or frequency thereof and/or change the settings for the one or more auxiliary devices, including any potential registration and/or deletion of an auxiliary devices in connection with connecting or disconnecting of the auxiliary device to one of the plugs on the pond filter unit.

It may also be possible to identify in the control unit that a box with a number of identified plugs is connected to a particular plug on the pond filter unit. This separate box may contain a plurality of plugs, e.g. 2, 3, 4, 5 or more separate plugs. When the box is identified in the pond filter control unit, it is possible to allow the control unit to perform individual control of each device connected to the respective plugs in the box.

The filter cleaning cycle is carried out by the control unit performing at least the following sequence:
Activate the at least one valve means to direct the outlet flow from a recirculation outlet to a waste water outlet of the pond filter unit and redirect the water to backwash the filter media,
Activate the filter cleaning motor unit to rotate the filter cleaning device in the vessel for one or more predefined time intervals during the cleaning cycle, Activate the pumping means for one or more predefined time intervals during the cleaning cycle to direct water to the waste water outlet,
Terminate the cleaning cycle by activating the at least one valve means to direct the outlet flow of the pond filter unit from the waste water outlet to the recirculation outlet.

Thus, the filter cleaning unit may be activated together with the pumping means being in back flush mode during the entire cleaning procedure.

When the filter cleaner rotates, the filter material, which is in contact with the rotating rod member, is radially compressed. This causes the filter to rotate and that the filter material is effectively cleaned while it is compressed during the contact with the cleaning rod while the filter rotates. This provides a simple but highly effective way to clean the entire filter by means of mechanical impact. The motor unit on the filter cleaner unit provides the possibility of an automated solution.

Alternatively, the filter cleaning unit is operated in intervals of 0.5-5 minutes, or 1-3 minutes. These intervals are repeated a number of times, e.g. at least two, three, four, five or six or more times. The pumping means, which provides the back flush flow of pond water through the filter is then activated during the intervals where the filter cleaner unit is off. This procedure may save water during the cleaning procedure as less water leaves the system as waste water.

In addition, it is ensured that any particulate matter which is cleaned from the filter is efficiently directed to the waste water outlet during the backflush period.

These possible cleaning cycles are suitable for daily cleaning of the filter material in the filter unit in order to maintain a healthy biofilm of microorganisms in the filter material. If the biofilter is cleaned with too low frequency, there is a risk that a certain part of the microorganisms present in the biofilm dies and degrades, thus resulting eutrophication of the fish pond.

In connection with the pond filter unit, the method for operating a pond filter also comprises that the control unit controls each of the one or more auxiliary devices. This allows that the control of the one or more auxiliary devices, e.g. external pumps, can be coordinated with the control of the pond filter.

For example, it also becomes possible to ensure that an automatic feeding device is not dispensing feed into the pond during a filter cleaning cycle. This ensures that the feed is not wasted because it is drawn directly into the pond filter and/or directed directly to the drain during a backflushing sequence where pond water is circulated through the filter and drained. Hereby is also avoided that the feed is trapped inside the filter and rots inside the filter unit.

The control of the one or more auxiliary devices are in one variant performed by controlling the power output in the plug to which the additional device is connected to the pond filter, such as by turning on/off the power supply or varying the output current to the relevant plug. This allows for a very simple control of e.g. an automatic feeding device or an air pump to be activated by a simple on/off control of the current supplied to the device through the plug on the pond filter unit to which the device is connected. Similarly, the effect of the auxiliary device can be easily adjusted by between a predefined minimum and maximum by adjusting the current supplied to the auxiliary device through the relevant plug on the pond filter. Thus, a very simple and easy control of e.g. air pumps and/or automatic feeding devices can hereby be obtained.

Alternatively, the control of the one or more auxiliary devices is obtained by providing a control signal to the one or more additional device by a wired connection, such as a low voltage control, e.g. 0-10 V control signal.

Alternatively, the control of the one or more auxiliary devices is obtained by providing a control signal to the one or more additional device by a wireless connection or as already described above.

The frequency and/or duration of the cleaning cycle, the UV radiation and/or the operation of the one the control of the one or more auxiliary devices can easily be adjusted on a remote-control unit, as described above.

The method for operating a pond filter unit comprises that the control unit further controls the UV lamp unit arranged to expose a water flow through the filter unit, the outlet flow of the filter unit, to ultraviolet radiation, based on input settings on the of duration of the ultraviolet radiation and/or intervals between activation of UV lamp. The control of the UV lamp is also coordinated in relation to the cleaning cycle of the pond filter.

As already discussed above, the UV lamp is applied to reduce the presence of algae in the pond by irradiating the pond water in the recycling outlet from the pond filter that directs pond water back to the pond. Thus, the pond filter control unit is designed to deactivate the UV lamp if it is active when a cleaning cycle is initiated either by automated activation by the control application and/or when a manually cleaning cycle is initiated by input on the remote control unit or the control display on the pond filter. This saves electrical energy, since there is no need to turn the UV-lamp on during backflushing sequences where the backflush water leaves the filter through to the waste water outlet.

The control regime of the UV lamp may depend on the season, the temperature and similar parameters that were already described above.

One or more sensors may be connected to the control unit by wired or wireless connections. The sensors provide input to the control unit to provide fully automated solutions that are adapted to the relevant pond and the conditions in the pond and its surroundings.

The one or more sensors may be selected according to the desired or relevant possible control options, e.g. as described below, and may include a combination to two or more of the sensors, e.g. three, four, five or six sensors:

- Temperature sensors that measure the water temperature either in the pond or in the filter unit. The temperature sensor may provide input to the control unit to control the frequency of the filter cleaning and/or the UV-lamp because warmer water has a tendency to have increased algae production and increased need for filter cleaning. The temperature sensor may also adjust the feeding rate of a potentially connected automatic feeding device, e.g. to reduce feeding rate in the winter period,
- pressure sensors that measure the pressure on at least one side of the filter material and provide input to the control unit to start a cleaning sequence when the pressure on the upstream side of the filter exceeds a set value. A pressure builds up on the upstream side of the filter is an indication of the filter being dirty or clogged. Or, in case that there is a pressure corresponding to atmospheric pressure on the upstream side of the filter, the pump may be defect, and an alarm may be activated, Rain gauges, water level sensors or the like may be connected to the control unit in the pond filter to provide a control signal to the valve of the filter unit to switch the valve position to rain/backflush position in order to drain water as waste water in case the pond is in risk of flooding, e.g. due to heavy rain. Similarly, when a low water level is detected in the pond, the control unit of the pond filter may provide a control signal to a tap water connection, e.g. a valve, to open to add fresh water to the pond,
- Light sensors to detect the correct functioning of the UV lamp, and provide an alarm when malfunctioning is detected, and/or
- Oxygen sensors to detect the oxygen concentration in the pond, which is used as an input by the pond filter control unit in the control of any air pumps that are connected to the pond filter plugs and/or second plugs.

BRIEF DESCRIPTION

Some of the embodiments will be described in detail, with references to the following Figures, wherein like designations denote like members, wherein.

DETAILED DESCRIPTION

Figure 1:
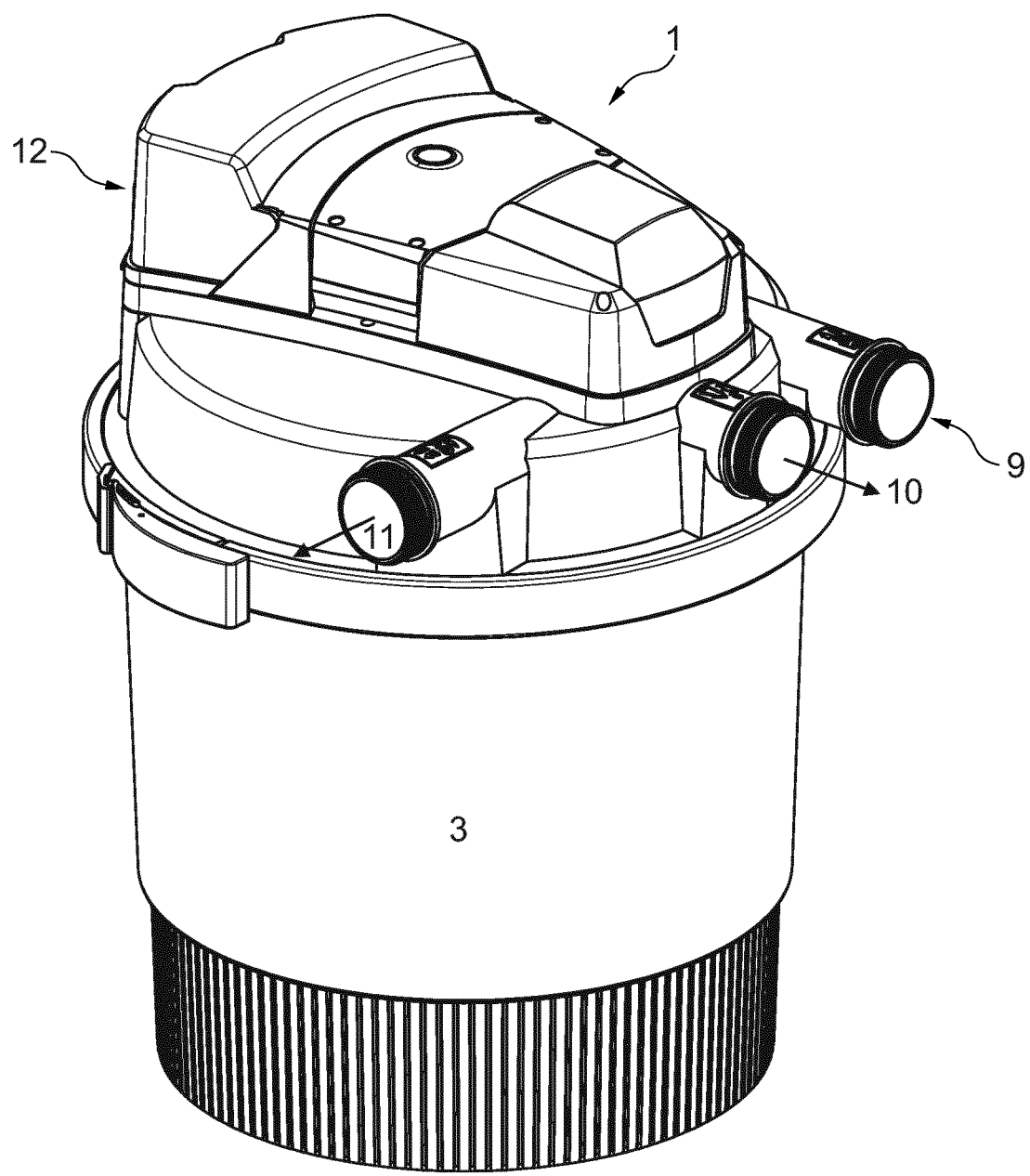
FIG. 1 shows a perspective view of an automated pond filter according to embodiments of the present invention.
Figure 2:
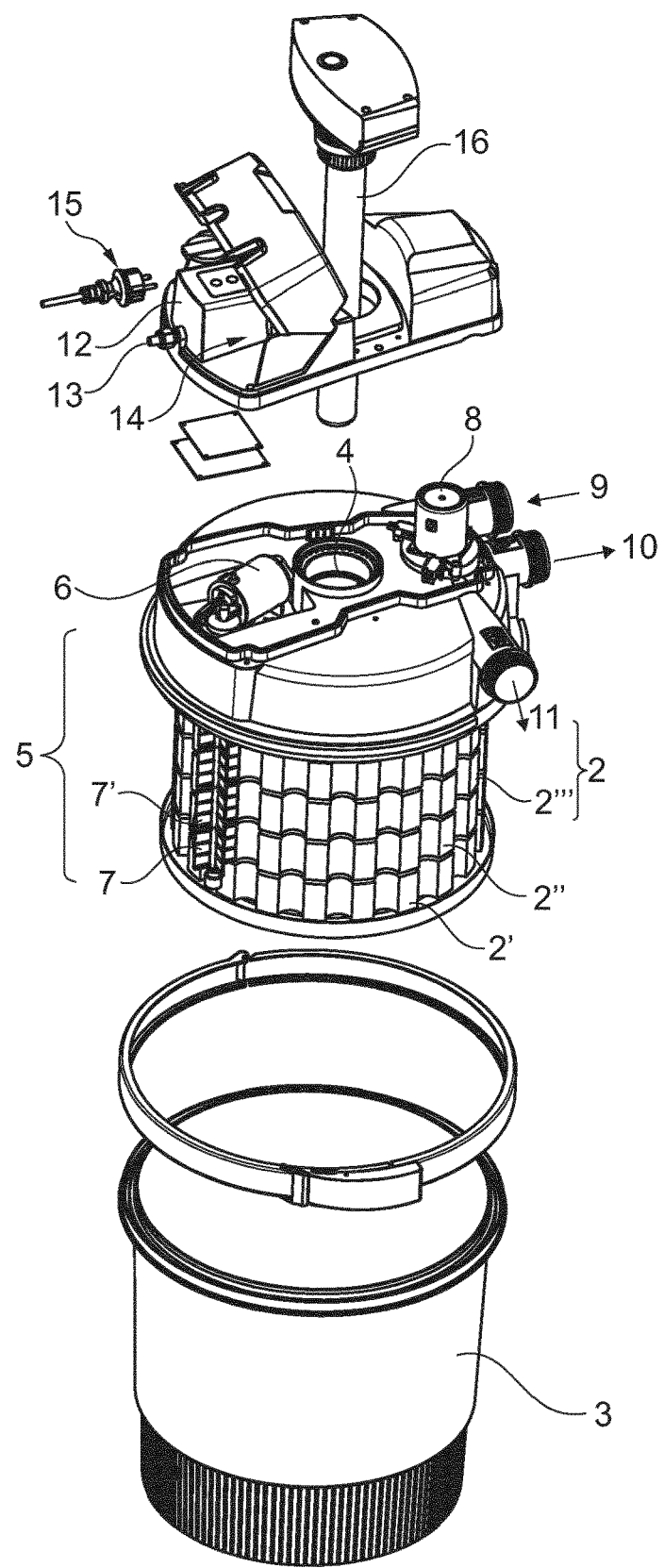
FIG. 2 shows an exploded view of an automated pond filter according to embodiments of the present invention.
Figure 3:
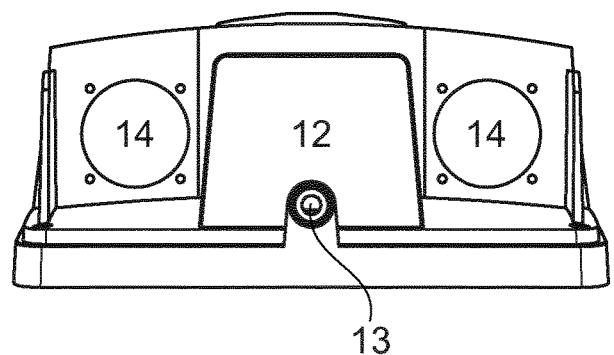
FIG. 3 shows a side view of the control unit and top part of the automated pond filter according to embodiments of the present invention.
Figure 4:
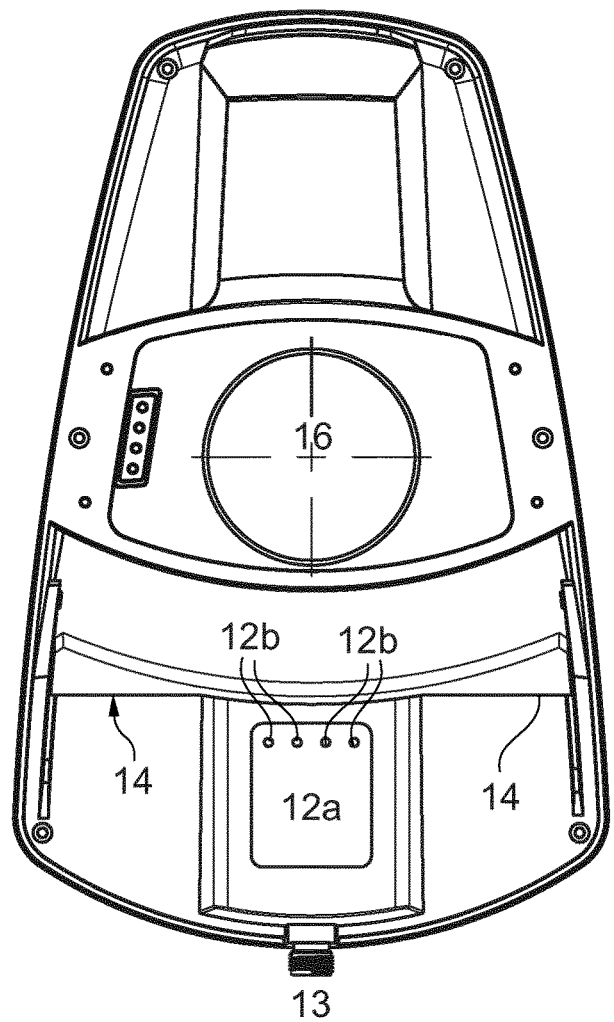
FIG. 4 shows a top view of the top part, including the control unit and of the automated pond filter according to embodiments of the present invention.

FIGS. 1-4 show a pond filter unit 1 according to embodiments of the present invention.

The pond filter 1 comprises a filter body 1. The filter body 2 in the pond filter unit comprises at least one or more blocks 2', 2", 2''' of flexible filter material, such as polymeric open pored foam or a flexible block of fibrous filter material that are arranged in a vessel 3. The one or more filter blocks 2', 2", 2''' comprises a central hole which is arranged on a central tube 4 that defines an outlet. In this way the one or more filter blocks 2, 2', 2''' are arranged to be rotatable in the vessel 3.

Figure 5:
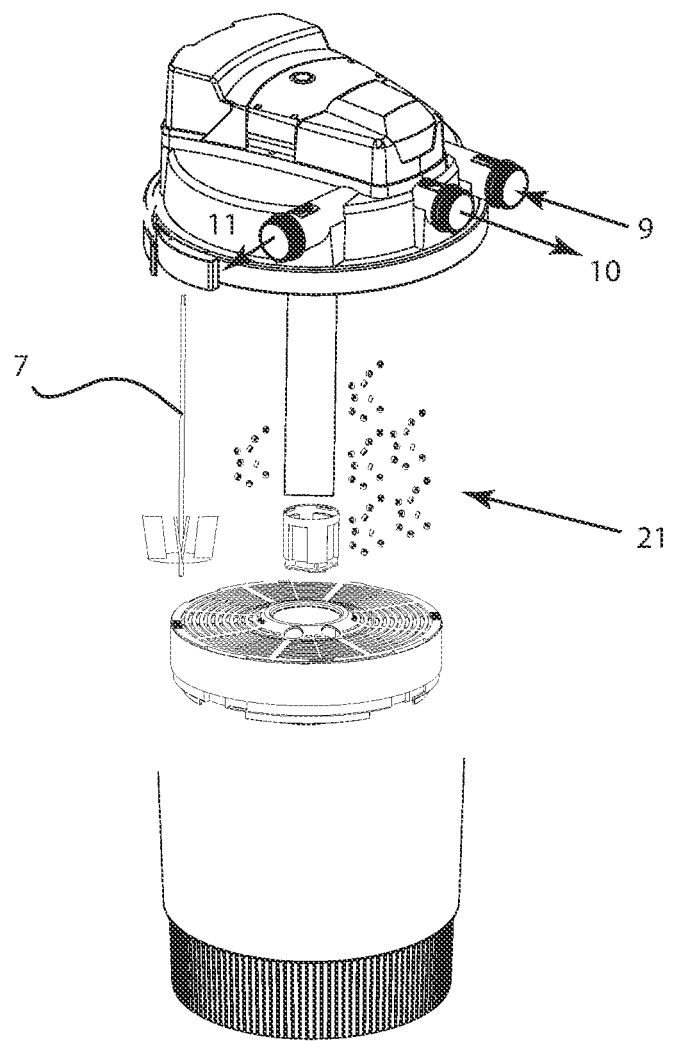
FIG. 5 shows an exploded view of an automated pond filter according to embodiments of the present invention.

The motorized cleaning unit 5 comprises a rotatable longitudinal rod 7 arranged in connection with the periphery of the filter material 2. The rotatable rod 7 presses against the outer surface of the one or more blocks of filter material 2. The rotatable rod has a profiled surface that causes a mechanical action against the outer surface of the filter blocks when the rod 7 is rotated by the motor unit 6. The profiled rod shown in FIG. 2 comprises radially extending wings 7' that are acting against the surface of the filter 2. Referring now to FIG. 5, the biofilter unit may comprise loose filter bodies 21 as discussed above. In embodiments, the rotatable longitudinal rod 7 stirs the loose filter bodies 21 to clean surplus biofilm and/or particulate material.

The motorized cleaning unit is controlled by means of control signals from the control unit 12.

In addition, the pond filter motorized cleaner the pond filter is equipped to provide backflushing of the filter 2. The backflushing means comprises a 3-way valve 8 that directs a reversed flow of pond water to a sewer when exiting the pond filter during the cleaning cycle. The 3-way valve 8 is valve is actuated to change the valve seat position based on control signals from the pond filter control unit 12. The 3-way valve 8 is a motorized magnetically actuated valve.

The pond filter unit 1 comprises a UV lamp unit 16 arranged in the central tube 4 to expose a water outlet flow to ultraviolet radiation. The control unit 12 is configured to control the operation of the UV lamp 16 according to input settings as described above.

The pond filter control unit is remote controllable by means of a remote-control unit as described above. The remote control unit may provide control signals by means of a wired or a wireless connection to the pond filter control unit, by providing an on/off/dimming of the current supplied through the one or more plugs 14 as described further above, or alternatively by a 0-10 V control signal supplied through a wired connection or a wireless connection, e.g. WIFI network, the mobile phone network, internet and/or a combination thereof. The remote control unit may thus be a conventional separately produced remote control unit based on short range wireless connection, in particular infrared connections. The remote control unit comprises a control application or program installed on a stationary or portable computer, a tablet and/or a cell phone, in particular a smart phone.

When the remote-control unit is a control application installed on a e.g. mobile phone, in particular a smart phone, it becomes possible to control the pond filter and/or the one or more auxiliary devices that are connected to the one or more plugs from a remote distance as described above.

In operation of the pond filter unit, a control unit 12 controls the operation of the pond filter unit, including the cleaning cycle of the filter 2. The pond filter unit further comprises one or more plugs 14 for connecting the power and/or control means or control of one or more auxiliary devices (not shown) via plugs 15. The control unit 12 of the pond filter then controls the one or more auxiliary devices based on set or preset stored input settings for each of the one or more auxiliary devices.

The pond filter control unit 12 is configured to activate/deactivate the cleaning cycle of the pond filter unit, i.e. the motor 6 of the motorized filter cleaning unit 5 and/or the 3 way valve 8, the UV lamp 16 and/or one or more auxiliary devices, either by automated activation/deactivation by the control unit 12 and/or when a manual input is made on the remote control unit or the control buttons 12a or a touch screen display 12b on the pond filter control unit. 12.

The control unit 12 may have indicators for displaying status (e.g. filtration mode; that a cleaning cycle is running; UV lamp on/off etc. of the pond filter, e.g. a number of LED indicators. Alternatively, status information may be displayed on the touch screen display.

The input means or input 12a on the control unit 12 or the touch screen control display on the pond filter control unit and/or the remote-control unit can also be used for changing the settings for the UV lamp as described above.

It may also be possible to identify in the control unit 12 that a box (not shown) with a number of identified plugs (e.g. 2, 3, 4, 5 or more separate plugs) is connected to a particular plug 14 or other on the pond filter unit 1 for allowing the control unit 12 to perform individual and/or groupwise control of each device connected to the respective plugs in the box.

The filter cleaning cycle is carried out by the control unit performing at least the following sequence: Activate the at least one valve 8 means or valve to direct the outlet flow from a recirculation outlet 10 for filtered water to a waste water outlet 11 of the pond filter unit 1 and optionally simultaneously reverse the flow through the filter 2 to provide for backflush of the filter. Then the filter cleaning motor unit 6 is activated to rotate the filter cleaning rod member 7 in the vessel 3.

The pumping means or pump (not shown) is activated for one or more predefined time intervals, e.g. 30 seconds for every 2 minutes, during the cleaning cycle to direct water to the waste water outlet 11. This may also provide a backflushing of the filter 2.

The cleaning cycle is terminated by activating the at least one valve means or valve 8 to direct the outlet flow of the pond filter unit from the waste water outlet 11 to the recirculation outlet 10. This will most often also mean that the pumping direction of the pump is reversed from the backflush direction to the filtering direction.

The method for operating a pond filter also comprises that the control unit 12 controls each of the one or more auxiliary devices. This allows that the control of the one or more auxiliary devices, e.g. external pumps, is to be coordinated with the control of the pond filter. For example, it also becomes possible to ensure that an automatic feeding device is not dispensing feed into the pond during a filter cleaning cycle as mentioned above.

The control of the one or more auxiliary devices are in one variant performed by controlling the power output in the plug 14 to which the additional device is connected to the pond filter 1. By turning on/off the power supply or varying the output current to the relevant plug 14, thus providing the simple and effective control of e.g. a light unit used near or in the pond, an automatic feeding device or an air pump to be activated by a simple on/off control of the current supplied to the device through the plug 14 on the pond filter unit 1 to which the device is connected. Similarly, the effect of the auxiliary device can be easily adjusted by between a predefined minimum and maximum by adjusting, i.e., increasing or lowering the current supplied to the auxiliary device through the relevant plug 1 on the pond filter 1. Alternatively, the control of the one or more auxiliary devices is obtained by providing a control signal to the one or more additional device by a wired connection, such as a low voltage control, e.g. 0-10 V control signal.

The frequency and/or duration of the cleaning cycle, the UV radiation and/or the operation of the one the control unit of the one or more auxiliary devices can easily be adjusted on a remote-control unit, as described above.

The method for operating a pond filter unit 1 comprises that the control unit 12 further controls the UV lamp unit 16 arranged to expose a water flow through the filter unit 1 based on input settings such as the of duration of the ultraviolet radiation and/or intervals between activation of UV lamp 16.

The control regime of the UV lamp 16 may depend on whether or not a cleaning cycle is activated, the season, the temperature and similar parameters that were already described above.

Sensors may be applied to provide input to the control unit as already explained above.

The special function and design make the pond filter unit 1 ideal for garden ponds, fountains, aquaculture ponds, aquaria, reservoirs and other aquatic applications.

In the simplest version of the filter unit, the control unit 12 is provided without remote control means or remote control. In this variant, the control unit is controlled by means of preset settings and/or settings that are input to the control unit via the buttons 11a or a touch screen display 12b.

This will conduct the following cleaning process: Optional pump switch off or reversing pumping direction, change position of the 3-way valve 8 to redirect flow from the recirculation outlet 10 for filtered water to the waste water outlet 11. Starting rotation of the filter cleaning rod 7 for cleaning of filter foam plates 2, 2" etc., Optional pump switch on (if off) for backwashing, in reversed flow mode. Optionally a Combined rotation of the rod 7 filter cleaner 5 and backwash sequence may be performed together or in sequence. This sequence is defined by a setting for a timer. The cleaning sequence is ended by changing the position of the 3-way valve 8 to redirecting the water from waste water outlet 11 the recirculation outlet 10. In addition, the water flow through the filter unit is reversed from backflushing direction to filtering direction. This procedure can also be applied in the remote controllable variant.

Further the backwash sequence of the cleaning sequence may comprise a possibility for providing settings that identify a programmed scheduled water change at certain intervals by guiding a certain amount of water to the waste water outlet 11 while a similar amount of water is supplied to the pond from another source, e.g. common tap water supply. This regular renewal of water is especially important for particularly polluted environments/ponds with heavy feeding causing waste—like aquaculture or other heavily stocked ponds, or during periods with heavy rain—in the latter case to avoid flooding of the pond.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS

1. Pond filter
2. Filter
3. Vessel
4. Central tube
5. Motorized filter cleaning unit
6. Motor
7. Longitudinal rod.
8. Valve
9. Water inlet
10. Filtered water outlet
11. Cleaning cycle water outlet
12. Control unit
    a. Display panel
    b. Input buttons
13. Power supply
14. Outlet plug for auxiliary device
15. Male plug for auxiliary device
16. UV lamp unit

The invention claimed is:

1. A fish and/or garden pond biofilter unit for pumping, circulating and purifying water, the pond biofilter unit comprising:
    a biofilter housed in a vessel and having a filter material on which a biofilm of microorganisms is grown, wherein the filter material in the pond biofilter unit comprises at least one or more blocks of flexible filter material, which is a polymeric open pored foam or a flexible block of fibrous filter material,
    at least one valve for controlling a water flow to and from the pond biofilter unit,
    a filter cleaning device for cleaning the filter material and/or for removal of surplus biofilm in the biofilter in the pond biofilter unit,
    an integrated control unit mounted on the vessel housing the biofilter and configured for controlling the operation of the pond biofilter unit, including a cleaning cycle of the biofilter, and
    one or more plugs mounted on the vessel housing the biofilter and to which one or more auxiliary devices are connectable, the one or more auxiliary devices selected from the group consisting of: one or more pumps, one or more additional pond filter units, one or more air pumps, one or more illumination units, and one or more feeder units for automated feeding of aquatic animals, wherein the integrated control unit further is configured to operate the one or more auxiliary devices based on input settings for each of the one or more auxiliary devices, and wherein the integrated control unit is configured to control each of the one or more auxiliary devices by controlling a power output in plug of the one or more plugs to which a respective auxiliary device is connected to the pond biofilter unit by turning on/off a power supply or varying an output electrical current or frequency to the plug of the one or more plugs.

2. The fish and/or garden pond biofilter unit according to claim 1, wherein the filter cleaning device comprises a motorized cleaning device, wherein the filter material further comprises one or more compartments or drums with loose filter bodies, and wherein the motorized cleaning device comprises a rotatable longitudinal rod arranged in the periphery of the filter material, and wherein the rotatable rod presses against the outer surface of at least one of the one or more blocks of filter material and/or stirs the loose filter bodies inside the one or more compartments or drum.

3. The fish and/or garden pond biofilter unit according to claim 1, further comprising a UV lamp unit arranged to expose water that has flowed through the biofilter to ultraviolet radiation, and that the integrated control unit is configured to control the operation of the UV lamp unit according to at least one of input settings of duration of the ultraviolet radiation and intervals between activation of ultraviolet radiation or based on input from one or more sensors.

4. The fish and/or garden pond biofilter unit according to claim 1, wherein the integrated control unit is remote controllable by a remote control unit, by a wireless connection, selected from infrared, radio frequency, Near Field Communication (NFC), Bluetooth, Long Range (LoRa), mobile phone network, local wired or WIFI network and a combination thereof.

5. The fish and/or garden pond biofilter unit according to claim 1, wherein a box with a number of identified plugs is connected to a particular plug on the pond biofilter unit and that the box is identified in the integrated control unit, wherein the box is configured to contain a plurality of plugs.

6. The fish and/or garden pond biofilter unit according to claim 1, wherein the input settings may be set on the integrated control unit by means of input devices, and wherein the integrated control unit comprises a display to display current settings for the pond biofilter unit and/or the one or more auxiliary devices.

7. A method for operating the fish and/or garden pond biofilter unit according to claim 1, comprising: controlling the operation of the pond biofilter unit, including the cleaning cycle of the biofilter.

8. The method for operating a fish and/or garden pond biofilter unit according to claim 7, wherein the one or more auxiliary devices includes the one or more pumps, wherein the cleaning cycle is carried out by the integrated control unit performing the following sequence:
    activating the at least one valve to direct an outlet flow from a recirculation outlet to a waste water outlet of the pond biofilter unit and redirect an inlet flow to backwash the filter material,
    activating a filter cleaning motor to rotate the filter cleaning device in the vessel for one or more predefined time intervals during the cleaning cycle,
    activating the one or more pumps for one or more predefined time intervals during the cleaning cycle to direct water to the waste water outlet, and
    terminating the cleaning cycle by activating the at least one valve to direct the outlet flow of the pond biofilter unit from the waste water outlet to the recirculation outlet.

9. The method for operating a fish and/or garden pond biofilter unit according to claim 7, wherein the integrated control unit further controls a UV lamp unit arranged to expose water that has flowed through the biofilter to ultraviolet radiation, based on input settings on at least one of the duration of the ultraviolet radiation and intervals between activation of the UV lamp unit.

10. The method for operating a fish and/or garden pond biofilter unit according to claim 7, wherein the integrated control unit is remote controllable by a remote control unit, by a wireless connection, selected from infrared, radio frequency, mobile phone network, Near Field Communication (NFC), Long Range (LoRa), Bluetooth, local wired or WIFI network and a combination thereof.

* * * * *